(12) United States Patent
Jang et al.

(10) Patent No.: US 7,289,582 B2
(45) Date of Patent: Oct. 30, 2007

(54) EMI CANCELLATION METHOD AND SYSTEM

(75) Inventors: Kyung-Oun Jang, Incheon (KR); Eung-Suen Kim, Incheon (KR)

(73) Assignee: Fairchild Korea Semiconductor, Ltd., Bucheon (KR)

( * ) Notice: Subject to any disclaimer, the term of this patent is extended or adjusted under 35 U.S.C. 154(b) by 813 days.

(21) Appl. No.: 10/665,080

(22) Filed: Sep. 16, 2003

(65) Prior Publication Data
US 2004/0096020 A1    May 20, 2004

(30) Foreign Application Priority Data
Oct. 29, 2002   (KR) ............... 10-2002-0066134

(51) Int. Cl.
*H03D 1/04*   (2006.01)
(52) U.S. Cl. ...................... 375/346; 455/296
(58) Field of Classification Search ............ 375/346, 375/287; 455/296
See application file for complete search history.

(56) References Cited

U.S. PATENT DOCUMENTS 5,731,728 A    3/1998   Greiss
5,736,893 A    4/1998   Puckette et al.
6,107,851 A    8/2000   Balakirshnan et al.
6,229,366 B1   5/2001   Balakirshnan et al.
6,249,876 B1   6/2001   Balakrishnan et al.

OTHER PUBLICATIONS

Alan B. Grebene, "Analog Integrated Circuit Design," *Van Nostrand Reinhold Company* (*Microelectronics Series*), (1972), p. 154.

*Primary Examiner*—Temesghen Ghebretinsae
*Assistant Examiner*—Juan Alberto Torres
(74) *Attorney, Agent, or Firm*—Sidley Austin LLP

(57) ABSTRACT

In an EMI canceller, a control signal generation unit includes a counter, a second flip-flop, and a multiplexer. The counter outputs first and second output signals and includes first flip-flops in series. An output of the first flip-flop reverses at every cycle of the first and second output signals of a previous first flip-flop. An output of the second flip-flop reverses at every cycle of the first or second output signal of a final first flip-flop. The second flip-flop outputs third and fourth output signals. The multiplexer passes the first output signals of the first flip-flop as a control signal when the third output signal is a first level, and passes the second output signals as the control signal when it is a second level.

10 Claims, 9 Drawing Sheets

EMI CANCELLATION METHOD AND SYSTEM

CROSS REFERENCE TO RELATED APPLICATION

This application is based on Korea Patent Application No. 2002-66134 filed on Oct. 29, 2002 in the Korean Intellectual Property Office, the content of which is incorporated in its entirety herein by this reference.

BACKGROUND OF THE INVENTION (a) Field of the Invention

The present invention relates to an electromagnetic interference (EMI) cancellation method and system.

(b) Description of the Related Art

The term electromagnetic interference means any electromagnetic disturbance that interrupts, degrades, or limits the effective performance of electrical equipment or systems. In particular, high frequency electric noise emitted from an electric device via small integrated chips imparts a negative effect to neighboring components, and the equipment may also experience unwanted effects with the noise generated by neighboring devices.

The electromagnetic interference intensity depends on the operation speed of semiconductor devices, the power applied to a drive, the operational frequency of a signal, load impedance, wire length, distance to a bypass capacitor, etc.

In order to reduce electromagnetic interference, various techniques have been developed such as canceling noise to a power supply using a line filter, distributing noise by broadening a noise-inducing part during a switch operation, isolating noise-sensitive parts on a printed circuit board (PCB) pattern, and increasing ground size.

However, these techniques have drawbacks in that to install an additional noise cancellation device such as a line filter or to modify the PCB circuit pattern so as to broaden or isolate a specific part thereon increases the manufacturing cost and system complexity.

SUMMARY OF THE INVENTION

It is an advantage of the present invention to perform electromagnetic interference cancellation without an additional noise cancellation device.

To achieve the above object, the electromagnetic interference cancellation system continuously changes the operation frequency of the oscillator.

In one aspect of the present invention, the electromagnetic interference cancellation system comprises a control signal generation unit, a voltage control unit, and an oscillator. The control signal generation unit includes a counter for counting n bits so as to output a first output signal of n bits with a count value and a second output signal having level that is opposite to the first output signal, the control signal generation unit alternately outputting the first and second output signals as control signals according to a cycle of the counter. The voltage control unit outputs a voltage having a step index level corresponding to the count value of the control signal, and an oscillator for generating a clock signal having a frequency corresponding to the voltage outputted from the voltage control unit, wherein the oscillator generates a clock signal having a frequency corresponding to the voltage outputted from the voltage control unit.

The counter preferably includes n first flip-flops that are coupled to each other in series. Each flip-flop outputs a 1-bit first output signal and a 1-bit second output signal, respectively, and is triggered to reverse the output at an edge where a first output signal of a previous first flip-flop becomes a first level.

The control signal generation unit includes a second flip-flop coupled to a final first flip-flop of the counter in series so as to reverse an output at an edge where a first output signal of the final first flip-flop becomes the first level, and a multiplexer for alternately outputting the first and second output signals of the n first flip-flops whenever the output level of the second flip-flop is reversed.

The multiplexer includes a first transmission gate for passing the first output signal when the first and second output signals of the first flip-flop are inputted and the output of the second flip-flop is a high level, and a second transmission gate for passing the second output signal when the output of the second flip-flop is a low level.

The voltage control unit generates a step index voltage having 2 n voltage levels corresponding to the count values, and the step index voltage increases and decreases according to the cycle of the counter. The oscillator receives the voltage of the voltage control unit as a high level voltage and generates a clock signal having a frequency which is in inverse proportion to a difference between the high level voltage and a reference low level voltage.

In another aspect of the present invention, a control signal generation unit includes a counter, a second flip-flop, and a multiplexer. The counter has n first flip-flops for respectively outputting first and second output signals with opposite levels, the n first flip-flops being coupled to each other in series and each first flip-flop reversing its output at every cycle of the first and second signals of a previous first flip-flop. A second flip-flop outputs third and fourth output signals having opposite levels and being reversed at every cycle of the first and second output signals of a final first flip-flop of the counter. The multiplexer passes the first signal of the n first flip-flops as a control signal of n bits when the third output signal of the second flip-flop is a first level, and passes the second output signals of the n first flip-flops as the control signal of n bits when the third output signal of the second flip-flop is a second level.

In still another aspect of the present invention, a method for canceling electromagnetic interference is provided. According to the method, an n-bit signal and a reverse signal of the n-bit signal are outputted by an n-bit counter at every cycle of the counter, the n-bit signal being counted by the n-bit counter. An output voltage having a step index level that increases or decreases stepwise according to a count value of the control signal is generated, and then a clock signal having a frequency corresponding to the level of the output voltage is generated.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention have been shown and described, simply by way of illustration of the best mode contemplated by the inventors of carrying out the invention. As will be realized, the invention is capable of modification in various obvious respects, all without departing from the invention. Accordingly, the drawings and description are to be regarded as illustrative in nature, and not restrictive.

An electromagnetic interference (EMI) cancellation method and system according to the embodiment of the present invention will be described with reference to the accompanying drawings hereinafter.

Figure 1:
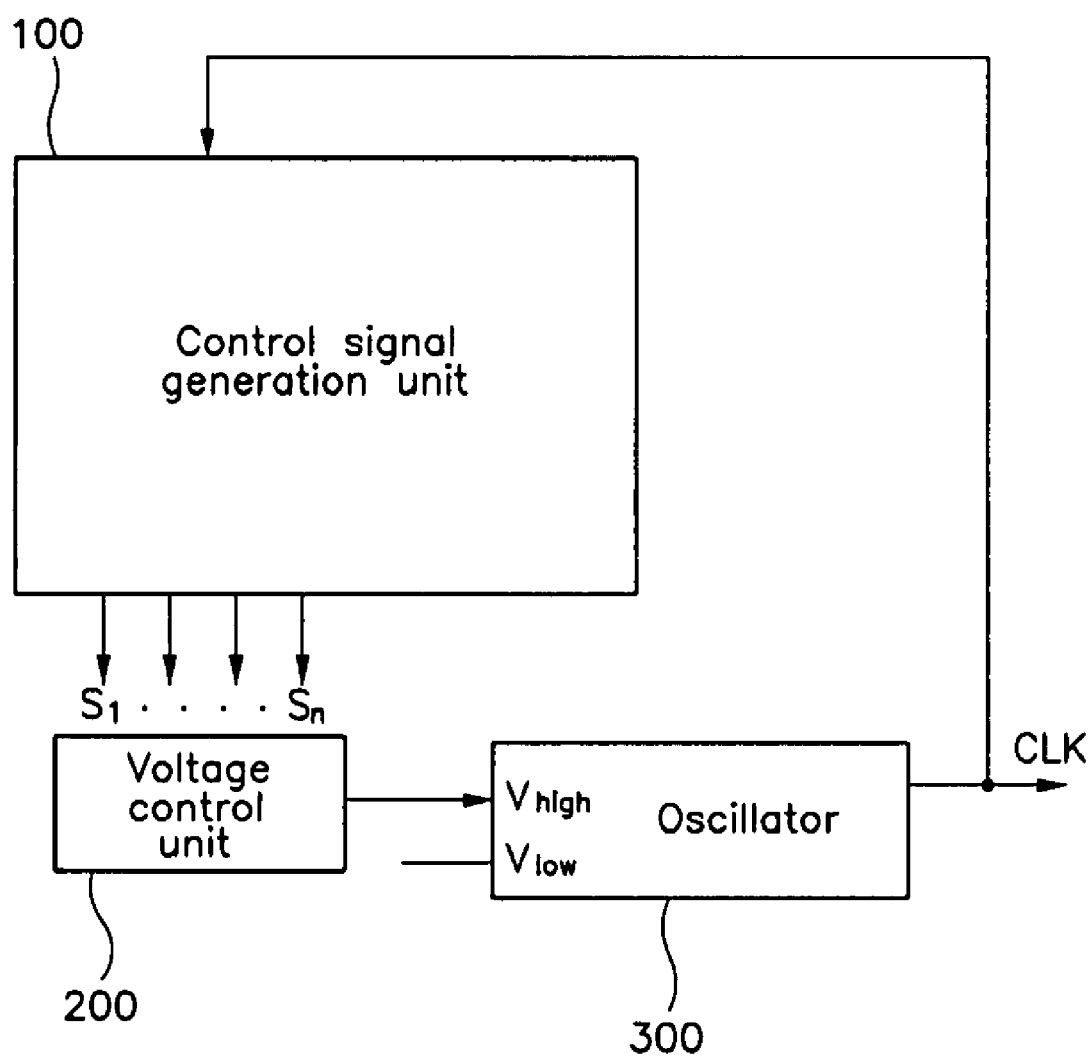
FIG. 1 is a schematic block diagram illustrating an electromagnetic interference cancellation system according to an embodiment of the present invention.
Figure 2:
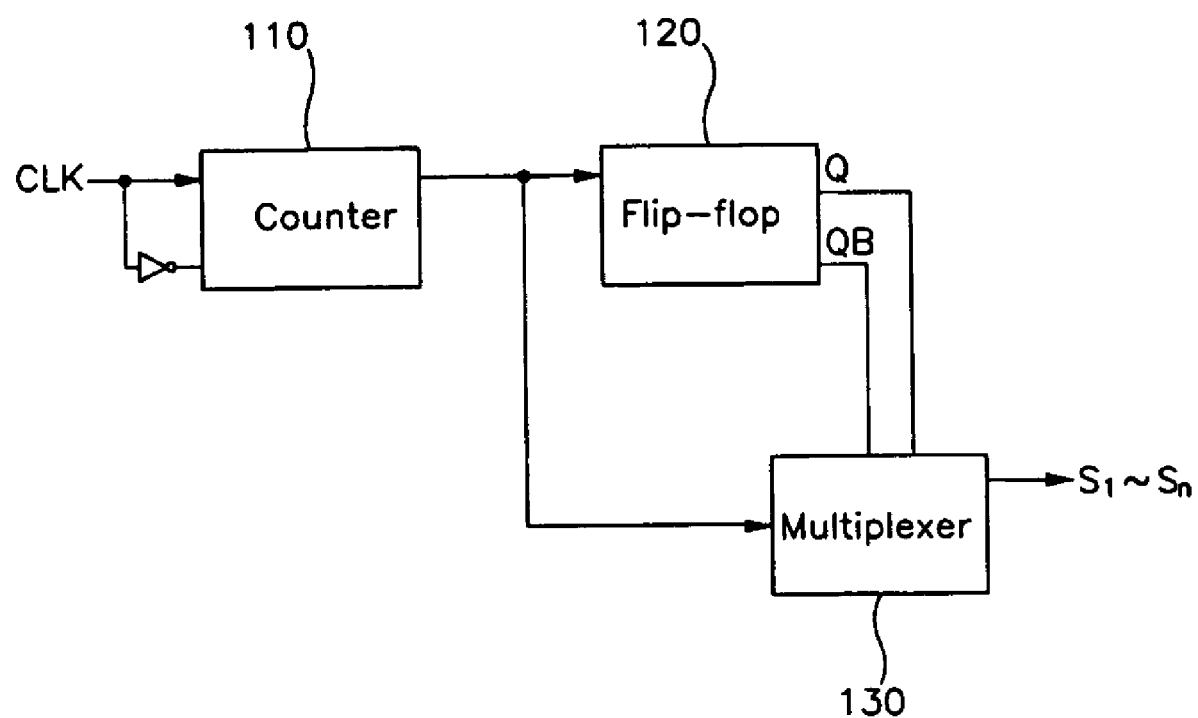
FIG. 2 is a schematic block diagram illustrating a control signal generation unit of an electromagnetic interference cancellation system according to an embodiment of the present invention.
Figure 3:
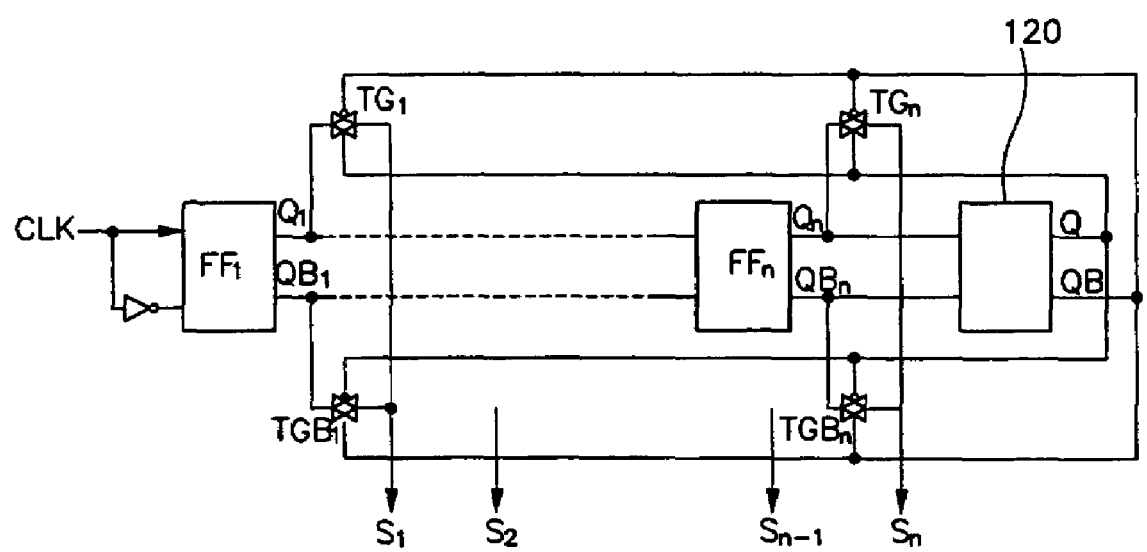
FIG. 3 is a detailed block diagram illustrating the control signal generation unit of FIG. 2.

FIG. 1 is a schematic block diagram illustrating the EMI cancellation system according to the embodiment of the present invention, FIG. 2 is a schematic block diagram illustrating a control signal generation unit of the electromagnetic interference cancellation system according to an embodiment of the present invention, and FIG. 3 is a detailed block diagram illustrating the control signal generation unit of FIG. 2.

As shown in FIG. 1, the EMI cancellation system according to the embodiment of the present invention comprises a control signal generation unit (100), a voltage control unit (200), and an oscillator (300). The control signal generation unit (100) receives a clock signal (CLK) initially outputted from the oscillator (300) so as to generate n control signals ($S_1$-$S_n$). The voltage control unit (200) outputs voltage ($V_{high}$) of n levels according to the control signal ($S_1$-$S_n$).

Referring to FIG. 2 and FIG. 3., the control signal generation unit (100) will be described in detailed.

As shown in FIG. 2 and FIG. 3, the control signal generation unit (100) includes a counter (110), a flip-flop (120), and a multiplexer (130). The counter (110) includes n flip-flops ($FF_1$-$FF_n$) such that an output of the flip-flop ($FF_n$) becomes an input of the flip-flop (120). Each of the flip-flops ($FF_1$-$FF_n$) outputs a pair of a normal and a reverse signal ($Q_1$-$Q_n$, $QB_1 QB_n$) and is triggered at a rising edge of a clock signal (CLK) and an output signal ($Q_1$-$Q_n$) of the previous flip-flop ($FF_1$-$FF_{n-1}$) so as to reverse the state of the output signal ($Q_1$-$Q_n$, $QB_1$-$QB_n$). That is, the output ($Q_1$-$Q_n$, $QB_1 QB_n$) of each flip-flop ($FF_1$-$FF_n$) reverses at every cycle of the signals (CLC and $Q_1$-$Q_{n-1}$) inputted to the flip-flop ($FF_1$-$FF_n$). Identically, the flip-flop (120) outputs a pair of a normal and a reverse state signal (Q and QB) and reverses the state of output signals (Q, QB) by being triggered at the rising edge of the output signal ($Q_n$) of the final flip-flop $FF_n$) of the counter (110).

The multiplexer (130) includes 2n transmission gates ($TG_1$-$TG_n$, $TGB_1$-$TGB_n$). The transmission gate ($TG_1$-$TG_n$) receives an output signal ($Q_1$-$Q_n$) of the flip-flop ($FF_1$-$FF_n$), and the transmission gate $TGB_1$-$TGB_n$ receives an output signal ($QB_1$-$QB_n$) of the flip-flop ($FF_1$-$FF_n$). The two transmission gates ($TG_1$-$TG_n$, $TGB_1$-$TGB_n$) transfer the output signals ($Q_1$-$Q_n$ or $QB_1 QB_n$) of each flip-flop ($FF_1$-$FF_n$) according to the states of the output signals (Q, QB).

Figure 4:
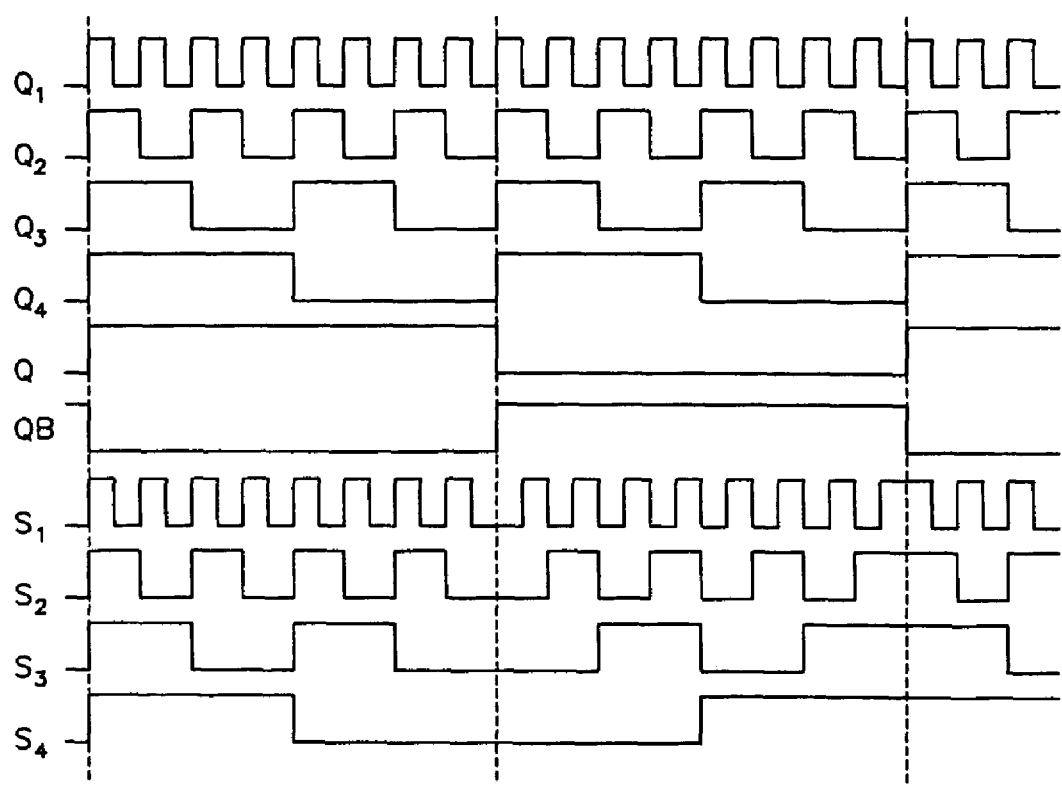
FIG. 4 is a timing chart illustrating output signals and control signals of a flip-flop of the control signal generation unit.

An operation of the control signal generation unit (100) according to the embodiment of the present invention will be described in more detail hereinafter with reference to FIG. 4. In FIG. 4, it is assumed that the counter (110) has 4 flip-flops ($FF_1$-$FF_4$) so as to generate 4 control signals ($S_1$-$S_4$) for convenience of explanation.

FIG. 4 is a timing chart illustrating output signals and control signals of a flip-flop of the control signal generation unit.

As shown in FIG. 4, the output signal ($Q_1$) of the flip-flop ($FF_1$) is triggered to rise at the rising edge of the clock signal (not shown) and to fall at the next rising edge of the clock signal (CLK). Identically, the output signal ($Q_2$) of the flip-flop ($FF_2$) is triggered to rise and fall at the rising edges of the output signal ($Q_1$) of the flip-flop ($FF_1$). In this manner, the output signal (Q) of the flip-flop (120) is triggered to rise and fall at the rising edges of the output signal ($Q_4$) of the final flip-flop ($FF_4$). The output signal (QB) of the flip-flop (120) is a reverse signal of the output signal (Q).

In FIG. 3, the output signals (Q, QB) of the flip-flop (120) are inputted to the respective transmission gates ($TG_1$-$TG_4$, $TBG_1$-$TBG_4$). Here, when the output signal (Q) of the flip-flop (120) is high and the output signal (QB) of the flip-flop (120) is low, the transmission gate ($TG_1$-$TG_4$) passes the output signal ($QB_1$-$QB_4$) as a control signal ($S_1$-$S_4$).

Accordingly, as shown in FIG. 4, when the output signal (Q) of the flip-flop (120) is high, the output signal ($Q_1$-$Q_4$) is outputted as the control signal ($S_1$-$S_4$) for the control signal generation unit (100), and when the output signal (Q) of the flip-flop (120) is low, the reverse signal ($QB_1$-$QB_4$) of the output signal ($Q_1$-$Q_4$) is outputted as the control signal ($S_1$-$S_4$). That is, the counter 110 alternately outputs the output signals ($Q_1$-$Q_n$) and the inverted output signals ($QB_1$-$QB_n$) as control signals ($S_1$-$S_n$) according to the period of counting n bits.

A method for generating clock signals having various frequencies according to the control signals ($S_1$-$S_n$) generated in this manner will be described with reference to FIG. 5 to FIG. 8.

Figure 5:
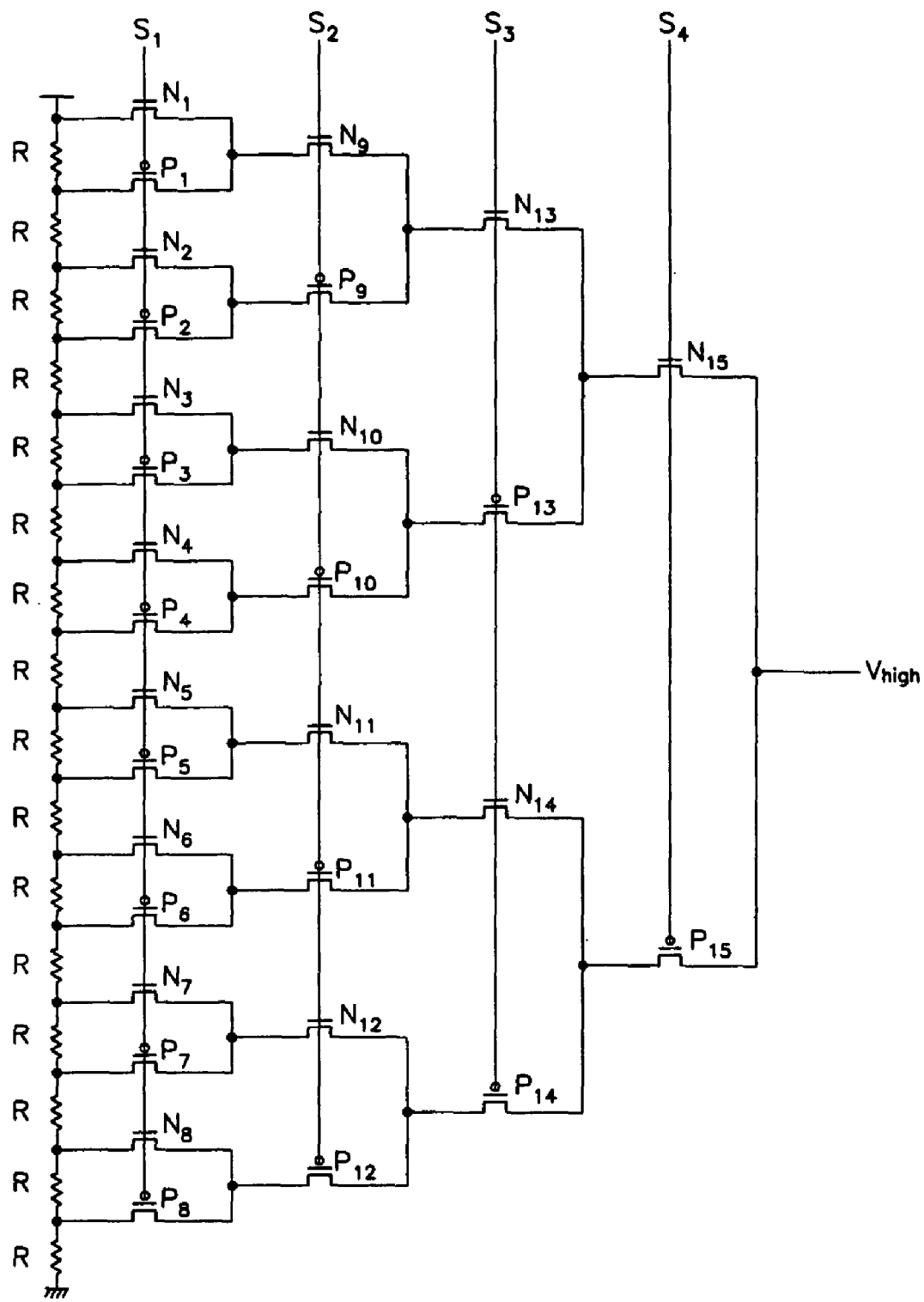
FIG. 5 is a schematic circuit diagram illustrating a voltage adjusting unit according to the embodiment of the present invention.
Figure 6:
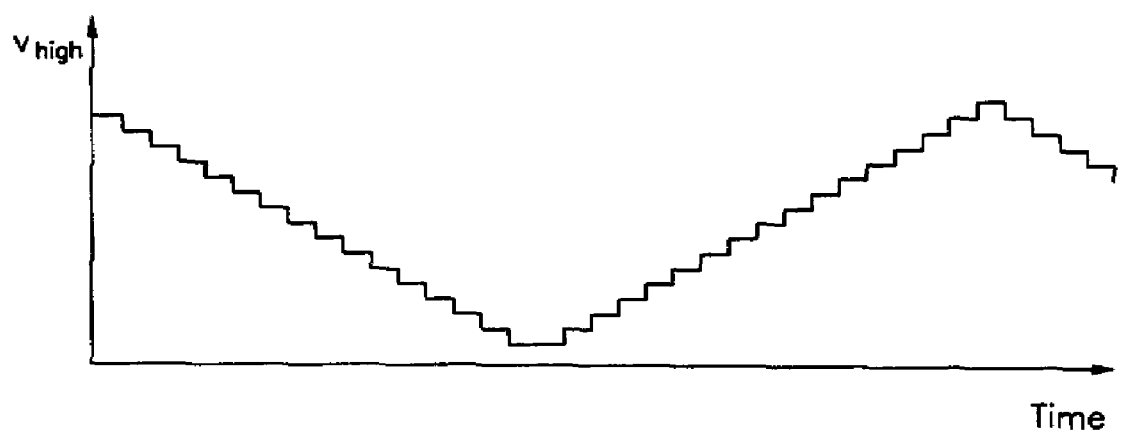
FIG. 6 is a graph for illustrating variation of output voltage level of a voltage control unit according to the embodiment of the present invention.
Figure 7:
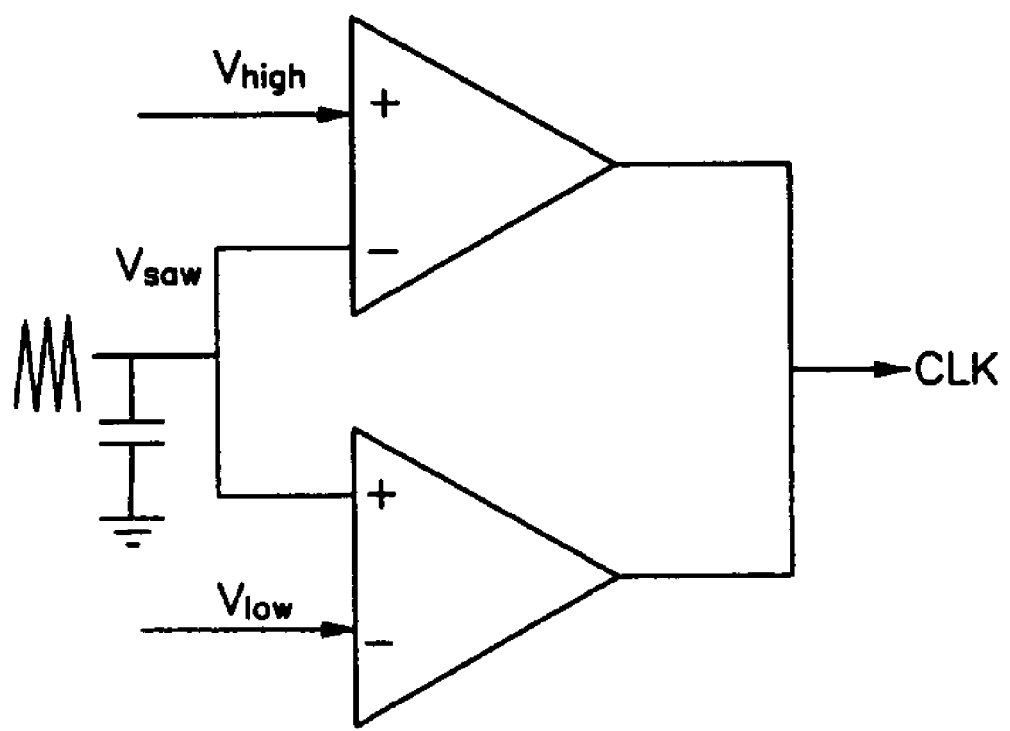
FIG. 7 is a schematic circuit diagram illustrating an oscillator according to the embodiment of the present invention.
Figure 8:
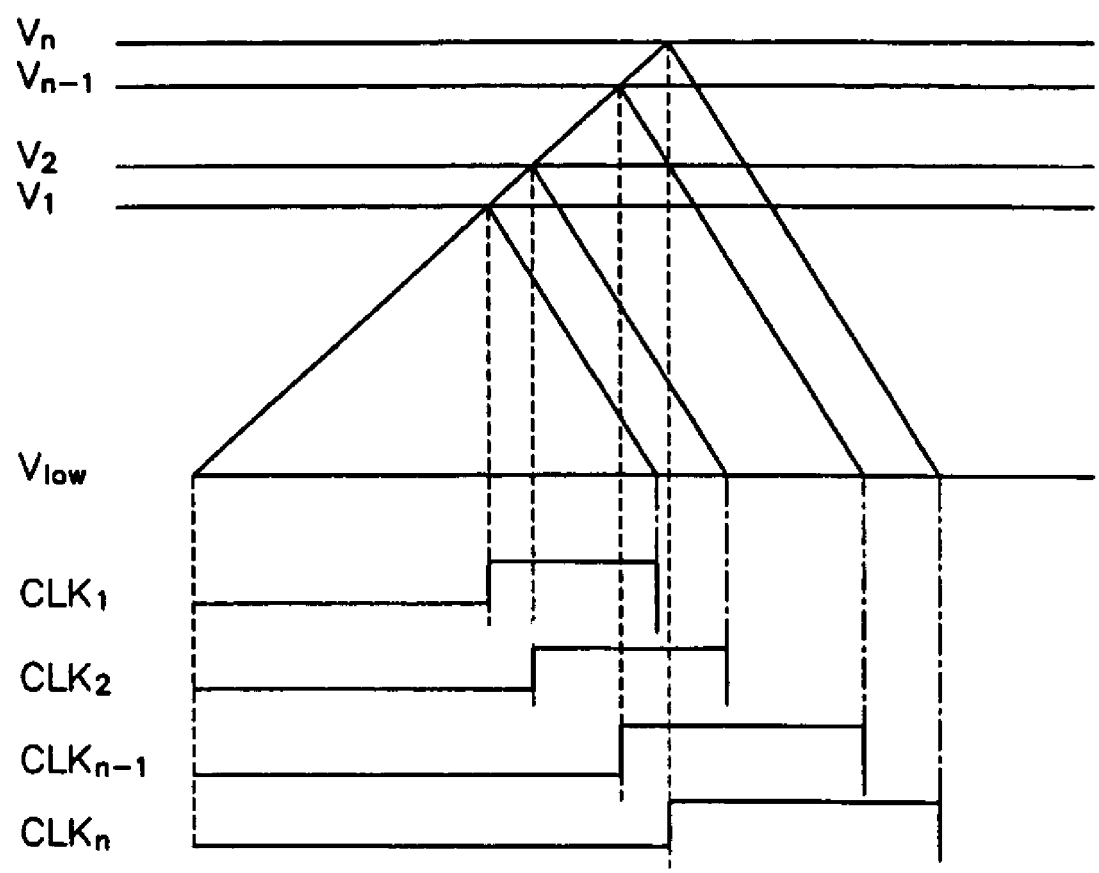
FIG. 8 is a timing diagram for illustrating clock signals generated by the oscillator according to the embodiment of the present invention.

FIG. 5 is a schematic circuit diagram illustrating a voltage adjusting unit according to the embodiment of the present invention, and FIG. 6 is a graph for illustrating variation of output voltage level of a voltage control unit according to the embodiment of the present invention. FIG. 7 is a schematic circuit diagram illustrating an oscillator according to the embodiment of the present invention, and FIG. 8 is a timing diagram for illustrating clock signals generated by the oscillator according to the embodiment of the present invention.

As shown in FIG. 5, the voltage control unit (200) includes 16 resistors (R) (typically $2^n$), 15 (=8+4+2+1) NMOS transistors ($N_1$-$N_{15}$), and 15 (=8+4+2+1) PMOS transistors ($P_1$-$P_{15}$). The resistors (R) are coupled in series between a power supply voltage (Vdd) and a ground voltage, and the NMOS transistors ($N_1$-$N_8$) and the PMOS transistors ($P_1$-$P_8$) are alternately coupled to the terminals of the resistors (R). The NMOS transistors ($N_1$-$N_8$) and the PMOS transistors ($P_1$-$P_8$) are coupled in parallel to the resistors R, and NMOS transistors $N_{13}$-$N_{14}$) and PMOS transistors ($P_{13}$, $P_{14}$) are alternately coupled to nodes of the NMOS transistors ($N_1$-$N_8$) and the PMOS transistors ($P_1$-$P_8$). Also, NMOS and PMOS transistors ($N_{15}$, $P_{15}$) are coupled to the nodes of the NMOS and PMOS transistors ($N_{13}$, $P_{13}$, $N_{14}$, $P_{14}$), respectively.

For example, the transistors ($N_1$, $N_9$, $N_{13}$, $N_{15}$) output the power supply voltage (Vdd) when the control signal is ($S_1$-$S_4$) is "1111", and output $15/16$ of the power supply voltage when the transistors ($N_1$, $N_9$, $N_{13}$, $N_{15}$) are "0111." In this manner, the transistors ($P_8$, $P_{12}$, $P_{14}$, $P_{15}$) output $1/16$ of the power supply voltage (Vdd).

Accordingly, the voltage control unit (200) can output the voltages ($V_1$-$V_n$) of 2n levels that increase or decrease stepwise, as shown in FIG. 6. Of course, the voltage control unit (200) can be implemented in another structure so as to output the control signals ($S_1$-$S_n$) that increase and decrease stepwise.

The voltages ($V_1$-$V_n$) outputted from the voltage control unit (200) are inputted to the oscillator (300) of FIG. 7 as a high voltage level ($V_{high}$). When an inputted sawtooth signal is charged to reach each stepwise voltage ($V_1$-$V_n$), the oscillator (300) generates and outputs clock signals ($CLK_1$-$CLK_n$). As shown in FIG. 8, the frequency of the clock signal ($CLK_1$-$CLK_n$) decreases as the level of the stepwise voltage ($V_1$-$V_n$) increases. That is, the oscillator (300) generates the clock signal ($CLK_1$-$CLK_n$) having a pulse width proportional to the difference between the high voltage level ($V_{high}$) and lower voltage level ($V_{low}$). In this way the frequency of the clock signal ($CLK_1$-$CLK_n$) can be adjusted in a predetermined range.

Figure 9:
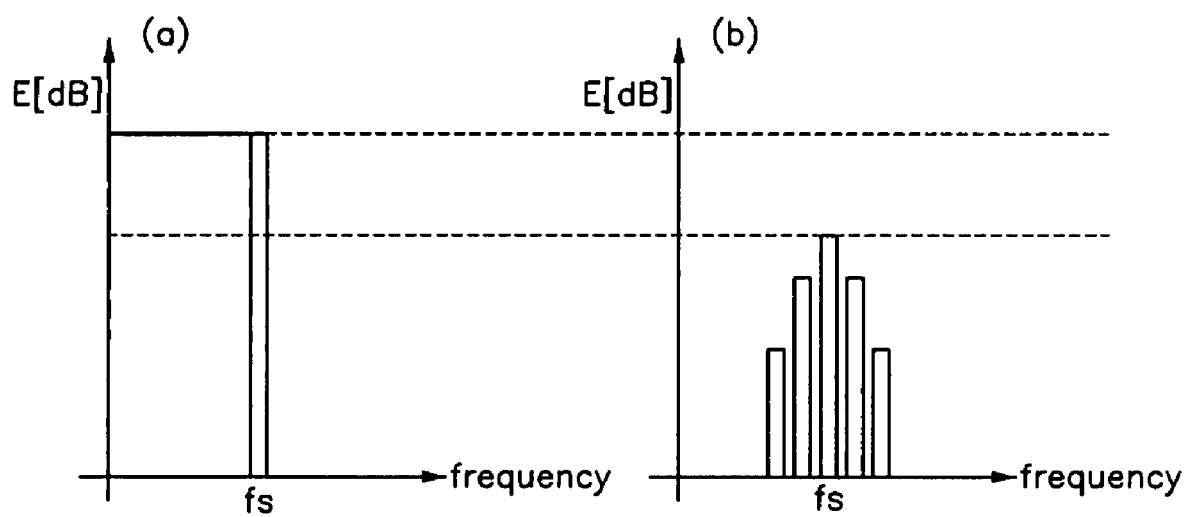
FIG. 9a is a graph illustrating an energy spectrum in a conventional system using a fixed frequency.
FIG. 9b is a graph illustrating an energy spectrum according to the embodiment of the present invention.

In case of using a fixed frequency, as shown in FIG. 9a, the energy spectrum is concentrated. However, according to the embodiment of the present invention, the frequency can be variously adjusted in a predetermined range such that the energy spectrum is distributed, as shown in FIG. 9b, so as to reduce the EMI.

According to the present invention, the frequency can be counted in the predetermined frequency range rather than the frequency being fixed such that it is possible to prevent the energy spectrum from being concentrated at a specific frequency. Accordingly, the EMI can be reduced by the distributed energy spectrum. Also, it is possible to reduce the total manufacturing costs because an additional noise removal device is not required.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An electromagnetic interference cancellation system comprising:
    a control signal generation unit having a counter that counts n-bit signals to output a first output signal of n bits with a count value, and a second output signal having a level that is opposite to the first output signal, the control signal generation unit alternately outputs the first and second output signals as control signals according to a cycle of the counter;

a voltage control unit that outputs a voltage having a step index level corresponding to the count value of the control signal; and an oscillator that generates a clock signal having a frequency corresponding to the voltage outputted from the voltage control unit.

2. The system of claim 1, wherein the counter comprises n first flip-flops that output 1 bit of the first and second output signals respectively, the flip-flops being coupled to each other in series, and
    the first flip-flop is triggered to reverse an output at an edge where a first output signal of a previous first flip-flop becomes a first level.

3. The system of claim 2, wherein the control signal generation unit comprises:
    a second flip-flop coupled to a final first flip-flop of the counter in series so as to reverse an output at an edge where a first output signal of the final first flip-flop becomes the first level; and
    a multiplexer that alternately outputs the first and second output signals of the n first flip-flops whenever the output level of the second flip-flop is reversed.

4. The system of claim 3, wherein the multiplexer comprises a first transmission gate for passing the first output signal when the first and second output signals of the first flip-flop are inputted and the output of the second flip-flop is a high level, and a second transmission gate for passing the second output signal when the output of the second flip-flop is a low level.

5. The system of claim 1, wherein the voltage control unit generates step index voltage having 2n voltage levels corresponding to the count values, and the step index voltage increases and decreases according to the cycle of the counter.

6. The system of claim 1, wherein the oscillator receives the voltage of the voltage control unit as a high level voltage, and generates a clock signal having a frequency which is in inverse proportion to a difference between the high level voltage and a reference low level voltage.

7. An EMI cancellation system comprising:
    a control signal generation unit comprising a counter having n first flip-flops that respectively output first and second output signals with opposite levels, the n first flip-flops being coupled to each other in series and each first flip-flop reversing outputs at every cycle of the first and second signals of a previous first flip-flop, a second flip-flop that outputs third and fourth output signals having opposite levels and being reversed at every cycle of the first and second output signals of a final first flip-flop of the counter, and a multiplexer for passing the first signals of the n first flip-flops as a control signal of n bits when the third output signal of the second flip-flop is a first level and passing the second output signals of the n first flip-flops as the control signal of n bits when the third output signal of the second flip-flop is a second level;

a voltage control unit that outputs voltages having respective step index levels corresponding to count values of n-bit control signals; and an oscillator that generates a clock signal having a frequency corresponding to the step index level of the voltage of the voltage control unit.

8. A method for canceling electromagnetic interference by generating clock signals having various frequencies in a predetermined range, the method comprising:

counting an n-bit signal by an n-bit counter; alternately outputting an n-bit signal and a reverse signal of the n-bit at every cycle by the counter;

generating an output voltage having a step index level which increases or decreases stepwise according to a count value of the control signal; and generating a clock signal having a frequency corresponding to the level of the output voltage.

9. The method of claim 8, wherein the step index level of the output voltage alternately increases and decreases according to the cycle of the counter.

10. The method of claim 8, wherein the clock signal is generated by an oscillator which receives the output voltage as a high level voltage such that the clock signal has a pulse width proportional to a difference between the high level voltage and a reference low level voltage.

* * * * *